United States Patent

Yu

[11] Patent Number: 6,141,383
[45] Date of Patent: Oct. 31, 2000

[54] METHOD FOR CONTROLLING TIMING BETWEEN VIDEO DECODING AND DISPLAYING AND APPARATUS THEREFOR

[75] Inventor: Pil-ho Yu, Suwon, Rep. of Korea

[73] Assignee: Samsung Electronics Co., Ltd., Kyungki-do, Rep. of Korea

[21] Appl. No.: 08/972,259

[22] Filed: Nov. 18, 1997

[30] Foreign Application Priority Data

Jun. 27, 1997 [KR] Rep. of Korea ............... 97-28146

[51] Int. Cl.$^7$ ............ H04N 7/12; H04N 11/02; H04N 11/04
[52] U.S. Cl. ............. 375/240.23; 348/845.1; 348/416
[58] Field of Search ............ 358/137; 348/845.1–3, 348/412, 413, 415, 416, 402; 375/240.23; H04N 11/02, 11/04, 7/12

[56] References Cited

U.S. PATENT DOCUMENTS

| | | | |
|---|---|---|---|
| 5,293,229 | 3/1994 | Iu | 348/415 |
| 5,504,530 | 4/1996 | Obikane et al. | 348/413 |
| 5,510,840 | 4/1996 | Yonemitsu | 348/402 |
| 5,561,465 | 10/1996 | Fautien et al. | 348/415 |
| 5,574,504 | 11/1996 | Yagasaki et al. | 348/415 |

Primary Examiner—Howard Britton
Assistant Examiner—Nhon T. Diep
Attorney, Agent, or Firm—Sughrue, Mion, Zinn, Macpeak & Seas, PLLC

[57] ABSTRACT

A method and apparatus are provided for controlling the timing between video decoding and video displaying. The apparatus contains a video decoder for decoding a B picture included in an input video bitstream, on the basis of previous and following I and P pictures, a memory for storing the decoded B picture by one frame, and a decoding controller for comparing the amount of data displayed with the amount of data decoded while outputting the decoded B picture stored in the memory, and controlling decoding of a subsequent B picture to prevent the decoding from overlapping with the displaying. In the apparatus, although the memory space for B picture storage is set as one frame, the decoding of a picture is prevented from overlapping with the displaying thereof. Thus, decoding efficiency is not lessened even though a memory of two frame size is not employed.

14 Claims, 5 Drawing Sheets

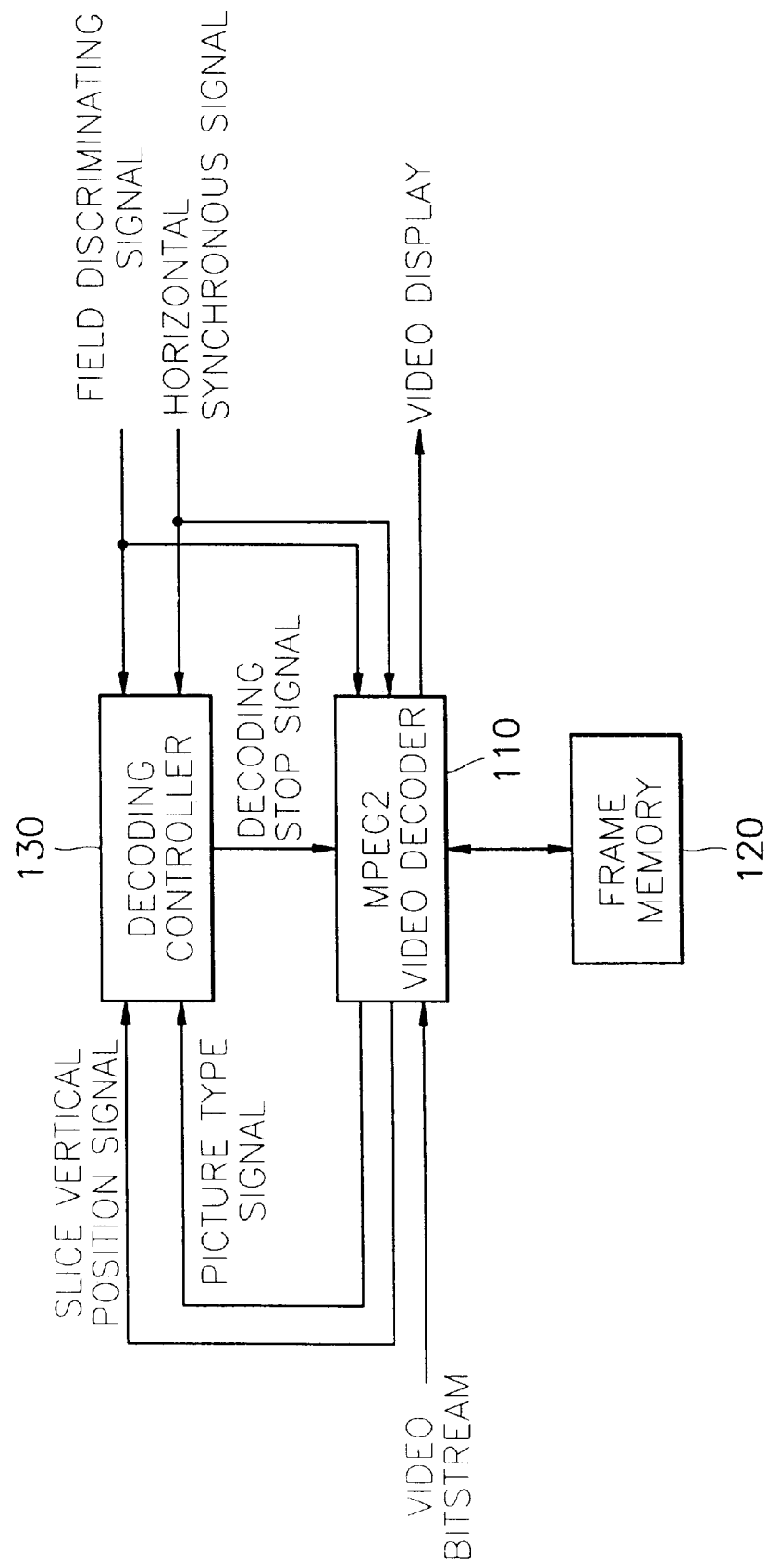

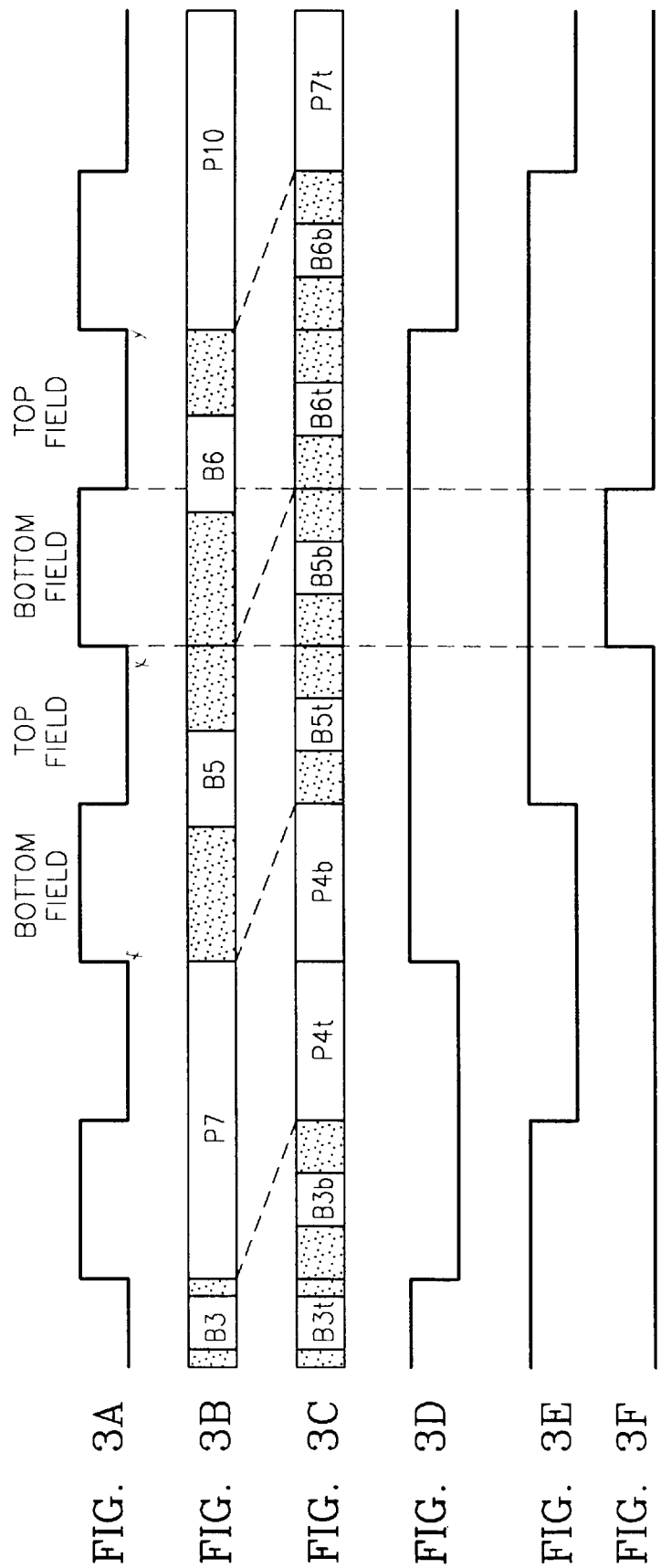

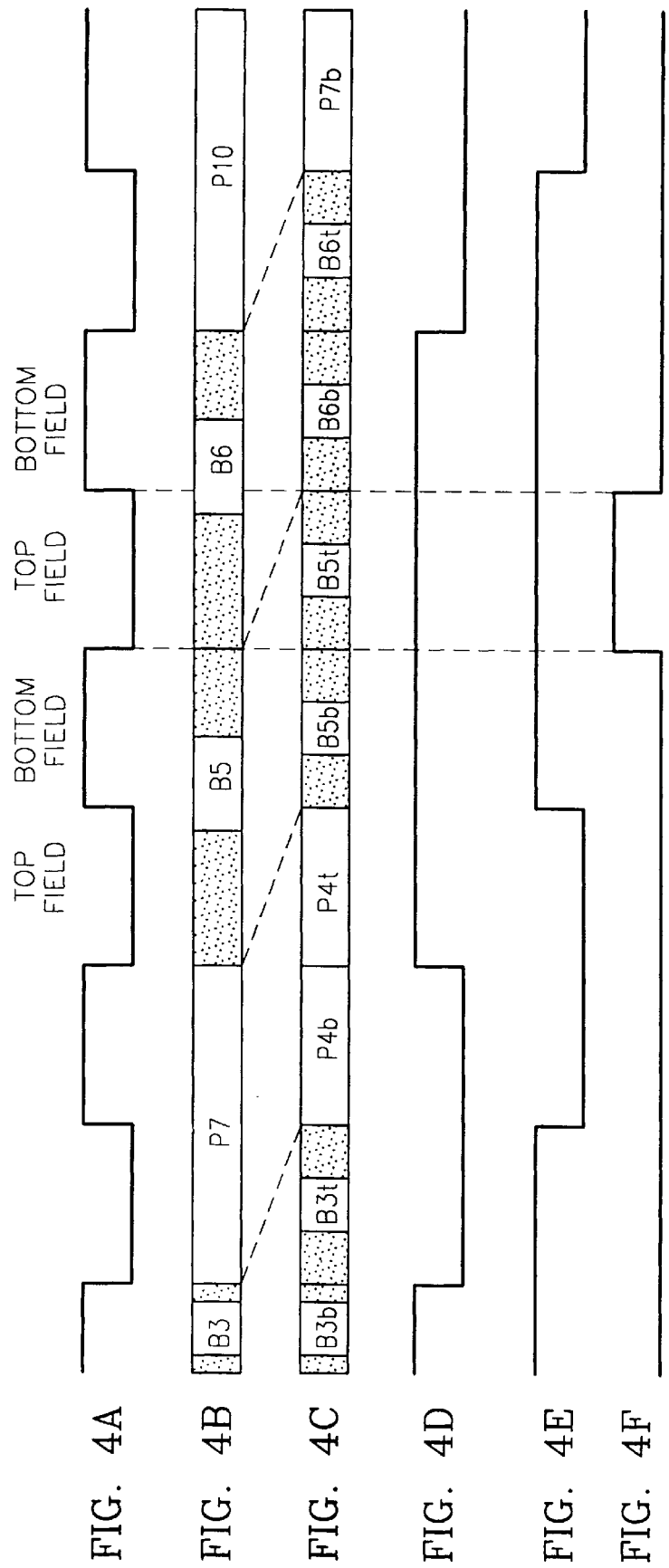

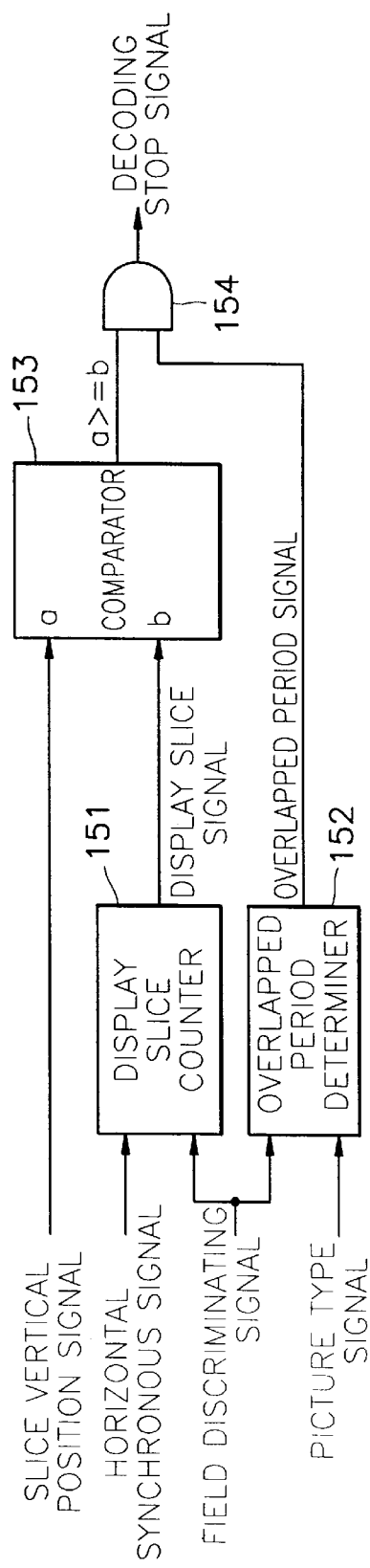
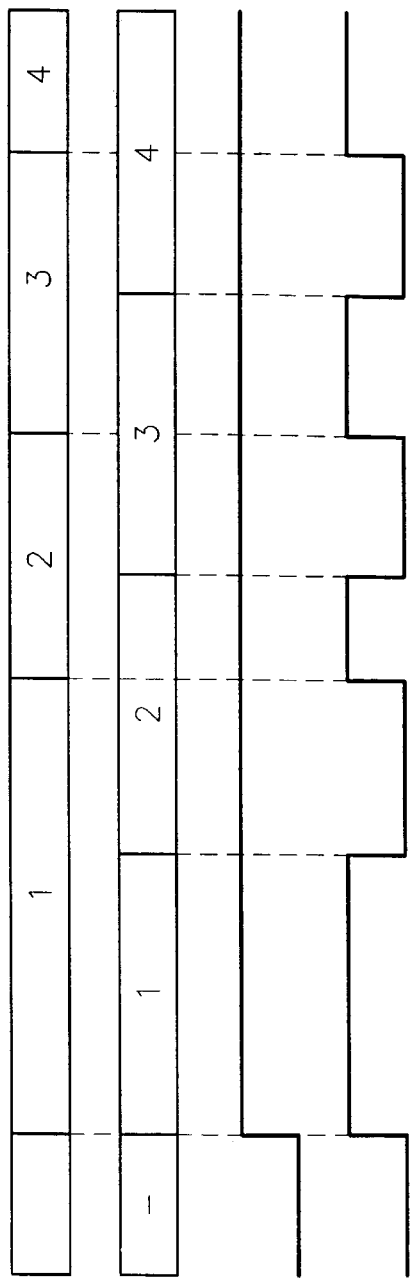
FIG. 5
FIG. 6A
FIG. 6B
FIG. 6C
FIG. 6D

METHOD FOR CONTROLLING TIMING BETWEEN VIDEO DECODING AND DISPLAYING AND APPARATUS THEREFOR

FIELD OF THE INVENTION

The present invention relates to a decoding technology, and more particularly, to a method for controlling timing between decoding and displaying of successive B pictures in a video decoder for decoding bitstream, and an apparatus therefor.

BACKGROUND OF THE INVENTION

An MPEG(moving picture experts group)-2 video includes three picture types: an intra-coded (I) picture, a bidirectionally-coded (B) picture and a predictive-coded (P) picture. The MPEG-2 video is coded in frame picture units or field picture units. The I picture can be decoded regardless of other pictures, the P picture can be decoded from a previous I or P (I/P) picture, and the B picture can be decoded from previous I/P pictures and subsequent I/P pictures.

When the I, B and P pictures are all included in input pictures, the sequence of decoding differs from that of displaying. Accordingly, timing between decoding and displaying of the input pictures must be properly controlled to restore the original picture. Therefore, the video decoder must include frame memories for decoding the I or P pictures. Further, a memory must be provided wherein the previous and subsequent I/P frames for B picture decoding are stored.

When the B picture is a frame picture that must be displayed in field units, the B picture should be displayed after at least one field is stored. However, when the B picture is stored by only one field, one frame must be decoded while displaying one field. As a result, decoding time distribution is not efficient.

In addition, where one frame of the B picture is decoded and stored, and the size of a memory for B picture storage is set as two frames to store one following frame of the B picture during displaying the stored B picture of one frame, the timing between decoding and displaying is easily controlled, but hardware burden is increased.

Since the maximum frame size of an MPEG-2 main profile high level is about 27 Mbit, it is economical to set the memory space for B picture storage as one frame. However, when the B picture is stored only by one frame and the B picture is a frame picture which should be displayed in field units, the control of timing between decoding and displaying of successive B pictures becomes complicated.

SUMMARY OF THE INVENTION

It is an object of the present invention to provide a method for setting the size of a memory, required for decoding and displaying of a B picture, as one frame, and providing a control to prevent the overlap of decoded data of successive B pictures with displayed data thereof.

It is another object of the present invention to provide an apparatus for setting the size of a memory, required for decoding and displaying of a B picture, as one frame, and making easy control to prevent the overlap of decoded data of successive B pictures with displayed data thereof.

To accomplish the first object, there is provided a method for controlling the timing between video decoding and video displaying in a video decoder including a memory for storing decoded bidirectionally-coded (B) picture data. The method comprises the steps of: (a) decoding a first B picture, included in an input video bitstream, on the basis of previous and following intra-coded (I) and predictive-coded (P) pictures, and storing one frame of decoded first B picture data in the memory; displaying the decoded first B picture data stored in the memory and decoding a subsequent B picture; and (c) comparing the amount of data displayed with the amount of data decoded while the decoded first B picture is output from the memory for display, to control decoding of the subsequent B picture to prevent the decoding from overlapping with the displaying.

To accomplish the second object, a video decoder in an apparatus for controlling the timing between video decoding and video displaying, decodes a B picture included in an input video bitstream, on the basis of previous and following I and P pictures. A memory stores the decoded B picture by one frame. A decoding controller compares the displaying degree with the decoding degree while outputting the decoded B picture stored in the memory, and controls decoding of the B picture to prevent the decoding from overlapping with the displaying.

BRIEF DESCRIPTION OF THE DRAWINGS

The above objects and advantages of the present invention will become more apparent by describing in detail a preferred embodiment thereof with reference to the attached drawings in which:

FIG. 1 is a block diagram of an apparatus for controlling timing between video decoding and displaying, according to the present invention;

FIGS. 3A through 3F are output timing views of the control apparatus of FIG. 1 in case that the top field first signal is "1";

FIGS. 4A through 4F are output timing views of the control apparatus of FIG. 1 in case that the top field first signal is "0";

FIG. 5 is a detailed block diagram of the decoding controller shown in FIG. 1; and FIGS. 6A through 6D are timing views of the input and output signals of the decoding controller shown in FIG. 5.

DETAILED DESCRIPTION OF THE INVENTION

Referring to FIG. 1, an MPEG-2 video decoder 110 decodes video data from an input video bitstream, detects a picture type signal, a slice vertical position signal and a top field first signal which are included in the video bitstream, and provides the detected picture type signal and the detected slice vertical position signal to a decoding controller 130. When the picture type signal included in the input bitstream is a B picture, the MPEG-2 video decoder 110 simultaneously decodes the video data and outputs the video data to be displayed on the basis of the top field first signal in synchronization with a field discriminating signal and a horizontal synchronous signal which are received from an external source. At this time, when a frame memory 120 setting a space for storing B pictures as one frame is used, the decoding of the B pictures overlaps with the displaying of the B pictures. That is, when the amount of data displayed (degree of displaying) precedes the amount of data decoded (degree of decoding), the decoding controller 130 generates a decoding stop signal to stop the decoding performed by the MPEG-2 video decoder 110. In this manner, the decoding is prevented from overlapping the displaying.

When the picture type signal included in the input bitstream is an I picture, the MPEG-2 video decoder 110 decodes the I picture, stores the decoded I picture data in the frame memory 120, and outputs previously stored I picture data for displaying in accordance with the top field first signal in synchronization with the field discriminating signal and the horizontal synchronous signal. When the picture type signal is a P picture, the MPEG-2 video decoder 110 decodes the P picture, stores the decoded P picture data in the frame memory 120, and outputs previously stored P picture data for displaying in accordance with the top field first signal in synchronization with the field discriminating signal and the horizontal synchronous signal, thereby outputting the original sequence which has not been subjected to an encoding process. At this time, frame memory areas for the I and P pictures, as well as a one-frame memory area for the B picture, are allocated in the frame memory 120.

Figure 2A:
FIG. 2A is an input timing view of an encoder to facilitate understanding of the present invention.
Figure 2B:
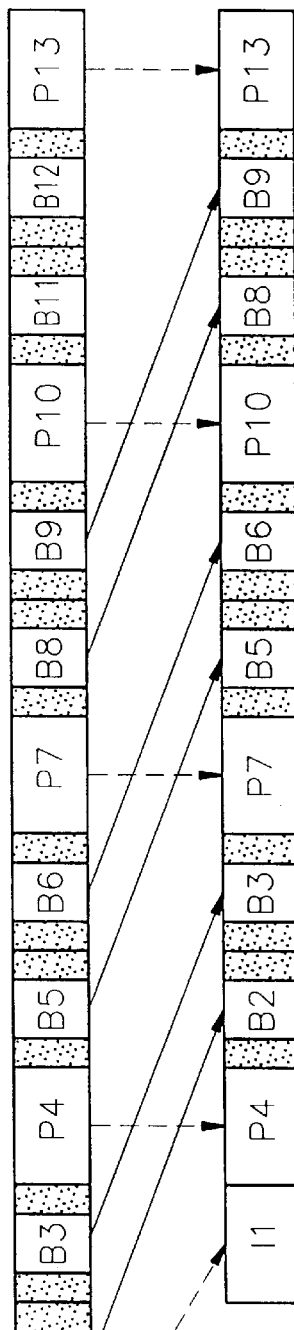
FIG. 2B is a timing view of the output of an encoder and the input of a decoder.
Figure 2C:
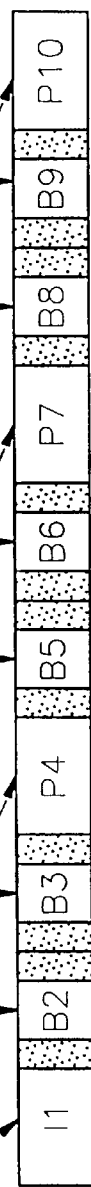
FIG. 2C is an output timing view of the decoder.

Here, when the B picture, as well as the I and P pictures, are included in the input bitstream, the sequence of decoding is different from that of displaying. Therefore, displaying should not be performed in the same sequence as that of decoding. That is, when the input sequence of an MPEG-2 video encoder (not shown) on a transmission side follows I1, B2, B3, P4, B5, B6, P7, B8, B9, P10, B11, B12, P13, . . . , as shown in FIG. 2A, the sequence of the output of the MPEG-2 video encoder and at the same time the input of the MPEG-2 video decoder 110 follow I1, P4, B2, B3, P7, B5, B6, P10, B8, B9, P13, . . . , as shown in FIG. 2B, and the sequence of the output of the MPEG-2 video decoder 110 is the same as that of the input of the MPEG-2 encoder such as I1, B2, B3, P4, B5, B6, P7, B8, B9, P10, . . . , as shown in FIG. 2C.

However, when only one frame is used as the size for storing the B pictures, the decoding and displaying of the B picture are overlapped as shown in FIGS. 3A through 4F. That is, the MPEG-2 video decoder 110 starts decoding an input picture which is a frame picture in a bottom field when the top field first signal included in the MPEG-2 video bitstream is "1." On the other hand, the MPEG-2 video decoder 110 starts decoding the input picture in a top field when the top field first signal is "0." A corresponding field is output to be displayed according to the externally input field discriminating signal, as shown in FIG. 3A.

Here, the top field first signal is information representing the sequence of the output field of a frame picture. When it is "1," the top field must be output in advance, and when it is "0," the bottom field must be output in advance. The top field is a field including every odd numbered lines such as a first line, a third line, . . . , of a frame, and the bottom field is a field including every even numbered lines such as a second line, a fourth line, . . . The field discriminating signal shown in FIG. 3A is an input signal provided by an external source to the MPEG-2 video decoder 110, and determines whether the output field is a top field or a bottom field. That is, when the field discriminating signal is "0," the output field is the top field, and when the field discriminating signal is "1," the output field is the bottom field.

Accordingly, when the top field first signal detected by the MPEG-2 video decoder 110 is "1," the period for decoding a picture is as shown in FIG. 3B, and, during the period for displaying a picture, the top field is decoded and output in advance as shown in FIG. 3C. When a picture currently being decoded is an I/P picture, the previous I/P picture is displayed. On the other hand, during the time when the B picture is being decoded, the B picture being decoded is displayed. Here, the sequences of picture decoding and picture displaying respectively shown in FIGS. 3B and 3C represent parts of those of picture decoding and picture displaying shown in FIGS. 2B and 2C. Also, "b" and "t" shown in FIG. 3C denote a bottom field and a top field, respectively.

Meanwhile, the period for B picture decoding is as shown in FIG. 3D, and the decoded B picture is displayed as shown in FIG. 3E. However, when a picture currently being decoded is a B picture, and when a previous decoded picture is also a B picture, the period for displaying a second field of the previous decoded B picture overlaps with that for decoding a current B picture, as shown in FIG. 3F.

During this overlapped period, the degree of decoding of a current picture is compared with that of displaying of a previously decoded picture in slice units. Then, previously decoded data is output, and current decoded data is then stored in the frame memory 120. The slice, being a coding unit of a lower-ranking than the picture, constitutes a picture and is a 16-line unit.

When the top field first signal included in the input bitstream is "0", timing views, where the bottom field is decoded and displayed in advance, are shown in FIGS. 4A through 4F. FIG. 4A represents a field discriminating signal, FIG. 4B represents a picture decoding period, FIG. 4C denotes a picture displaying period, FIG. 4D shows a B picture decoding period, FIG. 4E shows a B picture displaying period, and FIG. 4F shows a B picture overlapping period.

FIG. 5 is a detailed block diagram of the decoding controller 130 shown in FIG. 1. When a slice vertical position signal, in one picture, representing the degree of decoding is greater than or equal to a display slice signal representing the degree of displaying, during the period when the decoding of the B picture is overlapped with the displaying thereof, a decoding stop signal is generated to stop decoding of the MPEG-2 video decoder 110. Thus, the overlap of the decoding with the displaying is prevented.

The operation of the decoding controller 130 shown in FIG. 5 will be described with reference to the timing view of FIGS. 6A through 6D. That is, the slice vertical position signal shown in FIG. 6A is included in the video bitstream, and input to a first input "a" of a comparator 153. A display slice counter 151 counts an input horizontal synchronous signal, and outputs the display slice signal, as shown in FIG. 6B, whose count value increases with every eight signals. Also, the display slice counter 151 is reset whenever the logic of the field discriminating signal is changed. Here, the display slice counter 151 counts 8 horizontal synchronous signals because a slice of a frame picture has 16 lines and the 16 lines are separated into 8 lines in every field.

An overlapped period determiner 152 makes an overlapped period signal shown in FIG. 6C into "1" to indicate the start of the overlapping period, when a picture to be decoded is a B picture and its previous picture is also a B picture. In this case, the overlapped period determiner 152 also sets the overlapped period signal as "0" at the time when the field discriminating signal is changed, to indicate the end of the overlapped period. Here, the picture type signal is two-bit data included in the video bitstream. When the picture type signal is expressed as "01," the picture is an I picture. When the picture type signal is expressed as "10," the picture is a P picture. Also, when the picture type signal is expressed as "11," the picture is a B picture.

The comparator 153 compares the slice vertical position signal, as shown in FIG. 6A, with the slice signal output by the display slice counter 151, as shown in FIG. 6B. When the vertical position signal is greater than or equal to the display slice signal, the comparator 153 generates a logic "1" output signal. Accordingly, a decoding stop signal generator comprising an AND gate 154, performs an AND operation on the output signal of the comparator 153 and the overlapped period signal of logic "1", shown in FIG. 6C, provided by the overlapped period determiner 152. Then, the decoding stop signal generator generates a decoding stop signal of the logic "1" shown in FIG. 6D. The MPEG-2 video decoder 110 stops decoding when the decoding stop signal is "1", and stands by until the decoding stop signal returns to "0".

The embodiment of the present invention had been applied to the case when a frame picture is decoded and displayed in field units. However, the embodiment can be also applied to the case when a frame picture is decoded and displayed in frame units.

In the case of decoding and displaying a B picture, if the memory space for B picture storage is set as one field, a decoding efficiency is lowered. When the memory space is set as two frames, it raises a problem that the capacity of the memory should increase. To solve the above defects, the present invention sets the memory space for B picture storage as one frame, and simultaneously prevents picture decoding from overlapping with the picture displaying. Thus, the decoding efficiency is not degraded even though a memory of two-frame size is not employed.

What is claimed is:

1. A method for controlling the timing between video decoding and video displaying in a video decoder, said method comprising the steps of:

(a) decoding bidirectionally coded (B) picture data included in an input video bitstream on the basis of previous and following intra-coded (I) and predictive-coded (P) pictures to generate decoded B picture data, and storing one frame of said decoded B picture data in a memory;

(b) outputting said decoded B picture data stored in said memory for displaying, and decoding subsequent B picture data; and (c) controlling the decoding of said subsequent B picture data by comparing a degree of displaying of said decoded B picture data with a degree of decoding of said subsequent B picture data to prevent the decoding of said subsequent B picture data from overlapping with the displaying of said decoded B picture data, wherein said degree of displaying is an amount of decoded B picture data which is displayed and said degree of decoding is the amount of B picture data which is decoded.

2. A method for controlling the timing between video decoding and video displaying as claimed in claim 1, wherein, in step (c), when successive B pictures are provided in said input video bitstream for decoding while displaying previously decoded B pictures for each field, the degree of displaying is compared with the degree of decoding in incremental slice units during the display of a previously decoded B picture, and the degree of decoding of a subsequent B picture is controlled to prevent the decoding from preceding the displaying.

3. A method for controlling the timing between video decoding and video displaying as claimed in claim 1, wherein, in step (c), when successive B pictures are provided in said input video bitstream for decoding while displaying previously decoded B pictures for each frame, the degree of displaying is compared with the degree decoding in incremental slice units during the display of a previously decoded B frame picture, and the degree of decoding is controlled to prevent the decoding from preceding the displaying.

4. A method for controlling the timing between video decoding and video displaying as claimed in claim 1, wherein said step (a) further comprises the step of detecting a top field first signal representing a display field sequence of a frame picture, a slice vertical position signal in a picture representing the extent of decoding, and a picture type signal representing whether an input picture is an I, P or B picture, from said input video bitstream.

5. A method for controlling the timing between video decoding and video displaying as claimed in claim 4, wherein a top field is decoded during a bottom field display period when said top field first signal is a logic "high", and a bottom field is decoded during a top field display period when said top field first signal is a logic "low".

6. A method for controlling the timing between video decoding and video displaying as claimed in claim 4, wherein said step (c) comprises the substeps of:

(c1) counting an input horizontal synchronous signal in slice units and generating a display slice signal representing said degree of displaying;

(c2) generating an overlapped period signal in accordance with said picture type signal when a current picture to be decoded is a B picture and a previous picture is also a B picture;

(c3) comparing said slice vertical position signal with said display slice signal and generating a compared signal; and (c4) generating a decoding stop signal on the basis of said overlapped period signal and said compared signal.

7. A method for controlling the timing between video decoding and video displaying as claimed in claim 6, wherein, in said step (c4), said decoding stop signal is generated when said overlapped period signal indicates an overlapping of the decoding of a B picture with a displaying of a B picture and said slice vertical position signal is greater than or equal to said display slice signal.

8. An apparatus for controlling the timing between video decoding and video displaying, comprising:

a video decoder for decoding bidirectionally-coded (B) picture data included in an input video bitstream, on the basis of previous and following intra-coded (I) and predictive-coded (P) pictures to generate decoded B picture data;

a memory for storing one frame of said decoded B picture data; and a decoding controller for outputting said decoded B picture data for displaying and controlling decoding of a subsequent B picture data to prevent the decoding of said subsequent B picture data from overlapping with the displaying of said decoded B picture data by comparing a degree of displaying with a degree of decoding, wherein said degree of displaying is the amount of decoded B picture data which is displayed and said degree of decoding is the amount of input B picture data which is decoded.

9. An apparatus for controlling the timing between video decoding and video displaying, as claimed in claim 8, wherein when successive B pictures are provided in said input video stream for decoding while displaying said decoded B picture data for each field, said decoding controller compares the degree of displaying of said decoded B picture with the degree of decoding of said subsequent B picture in incremental slice units, and controls the degree of decoding to prevent the decoding from preceding the displaying.

10. An apparatus for controlling the timing between video decoding and video displaying, as claimed in claim 8, wherein when successive B pictures are provided in said input video stream for decoding while displaying said decoded B picture data for each frame, said decoding controller compares the degree of displaying with the degree of decoding in incremental slice units, and controls the degree of decoding to prevent the decoding from preceding the displaying.

11. An apparatus for controlling the timing between video decoding and video displaying as claimed in claim 8, wherein said video decoder detects a top field first signal representing a display field sequence of a frame picture, a slice vertical position signal in a picture representing said decoding degree, and a picture type signal representing whether an input picture is an I, P or B picture, from said input video bitstream.

12. An apparatus for controlling the timing between video decoding and video displaying as claimed in claim 11, wherein a top field is decoded during a bottom field display period when said top field first signal is a logic "high", and a bottom field is decoded during a top field display period when said top field first signal is a logic "low".

13. An apparatus for controlling the timing between video decoding and video displaying as claimed in claim 11, wherein said decoding controller comprises:

a display slice counter, which is reset according to an input field discriminating signal, for counting an input horizontal synchronous signal in incremental slice units and generating a display slice signal representing the degree of degree;

an overlapped period determiner for generating an overlapped period signal indicating when a current picture to be decoded is a B picture and a previously decoded picture is also a B picture;

a comparator for comparing said slice vertical position signal with said display slice signal and generating a compared signal; and a generator for generating a decoding stop signal on the basis of said overlapped period signal and a compared signal generated by said comparator.

14. An apparatus for controlling the timing between video decoding and video displaying as claimed in claim 13, wherein said generator generates said decoding stop signal when said overlapped period signal indicates the overlapping of the decoding of a current B picture with the displaying of a previously decoded B picture and said slice vertical position signal is greater than or equal to said display slice signal.

* * * * *